INVENTORS
Peter E. Engler
Jacobus A. Hammer

BY Popp and Sommer
ATTORNEYS

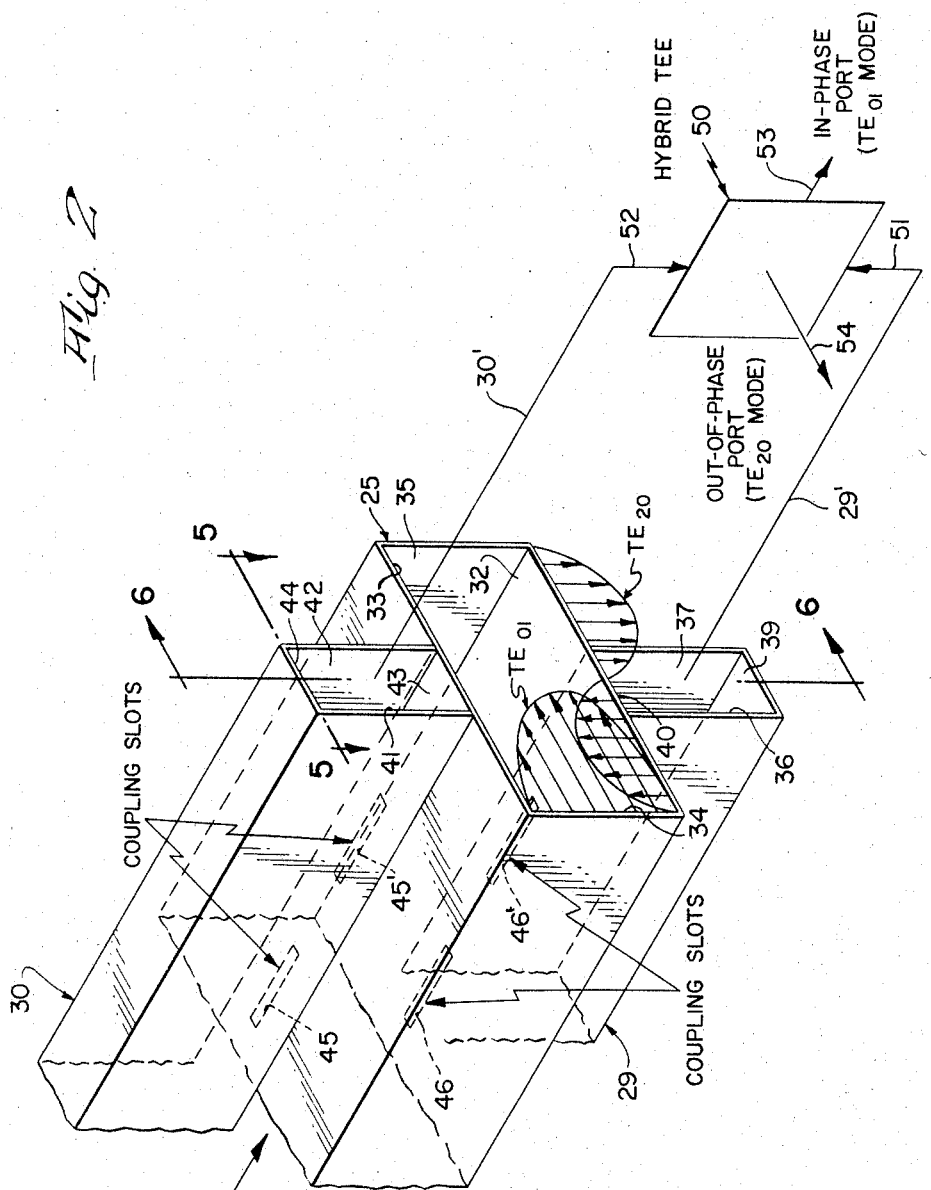

INVENTORS
Peter E. Engler
Jacobus A. Hammer
BY *Popp and Sommer*
ATTORNEYS

United States Patent Office 3,351,874
Patented Nov. 7, 1967

3,351,874
WAVEGUIDE APPARATUS FOR COUPLING OUT AND ISOLATING MODES ABOVE THE FUNDAMENTAL
Peter E. Engler, Cheektowaga, and Jacobus A. Hammer, Clarence, N.Y., assignors to Cornell Aeronautical Laboratory, Inc., Buffalo, N.Y., a corporation of New York
Filed Feb. 23, 1965, Ser. No. 434,375
5 Claims. (Cl. 333—10)

ABSTRACT OF THE DISCLOSURE

Electromagnetic wave apparatus having a higher mode coupler including an oversize rectangular waveguide arranged between two regular size waveguides, the broad sides of the oversize waveguide and the narrow sides of the regular size waveguides providing common walls having coupling slots therein.

---

This invention relates to electromagnetic wave apparatus, and more particularly to means for coupling out higher modes from a waveguide so dimensioned that the fundamental mode and higher modes of an electromagnetic wave can propagate therein.

The invention is based upon the principle that the provision of elongated central slots in opposite broad sides of an oversize rectangular waveguide, i.e. one so dimensioned that the fundamental mode and higher modes of an electromagnetic wave can propagate therein, permit one higher mode to be coupled out in phase with respect to another higher mode through the slot in one broad side but out of phase through the slot in the other broad side.

It is therefore an object of the present invention to utilize the above principle to provide a higher mode coupler which comprises an oversize waveguide.

Another object is to provide a higher mode coupler between an oversize waveguide and two regular size waveguides, i.e. ones so dimensioned that only the fundamental mode can propagate therein for coupling two higher modes separately.

Another object is to provide a higher mode coupler which is directional.

Another object is to provide means for measuring the intensity of higher modes in an oversize waveguide separately.

Other objects and advantages of the present invention will be apparent from the following detailed description of a preferred embodiment taken in conjunction with the accompanying drawings in which:

FIG. 2 is a perspective view of the higher mode coupler of the present invention as viewed in cross-section and illustrating the same diagrammatically with the aforesaid measuring means.

Figure 1:
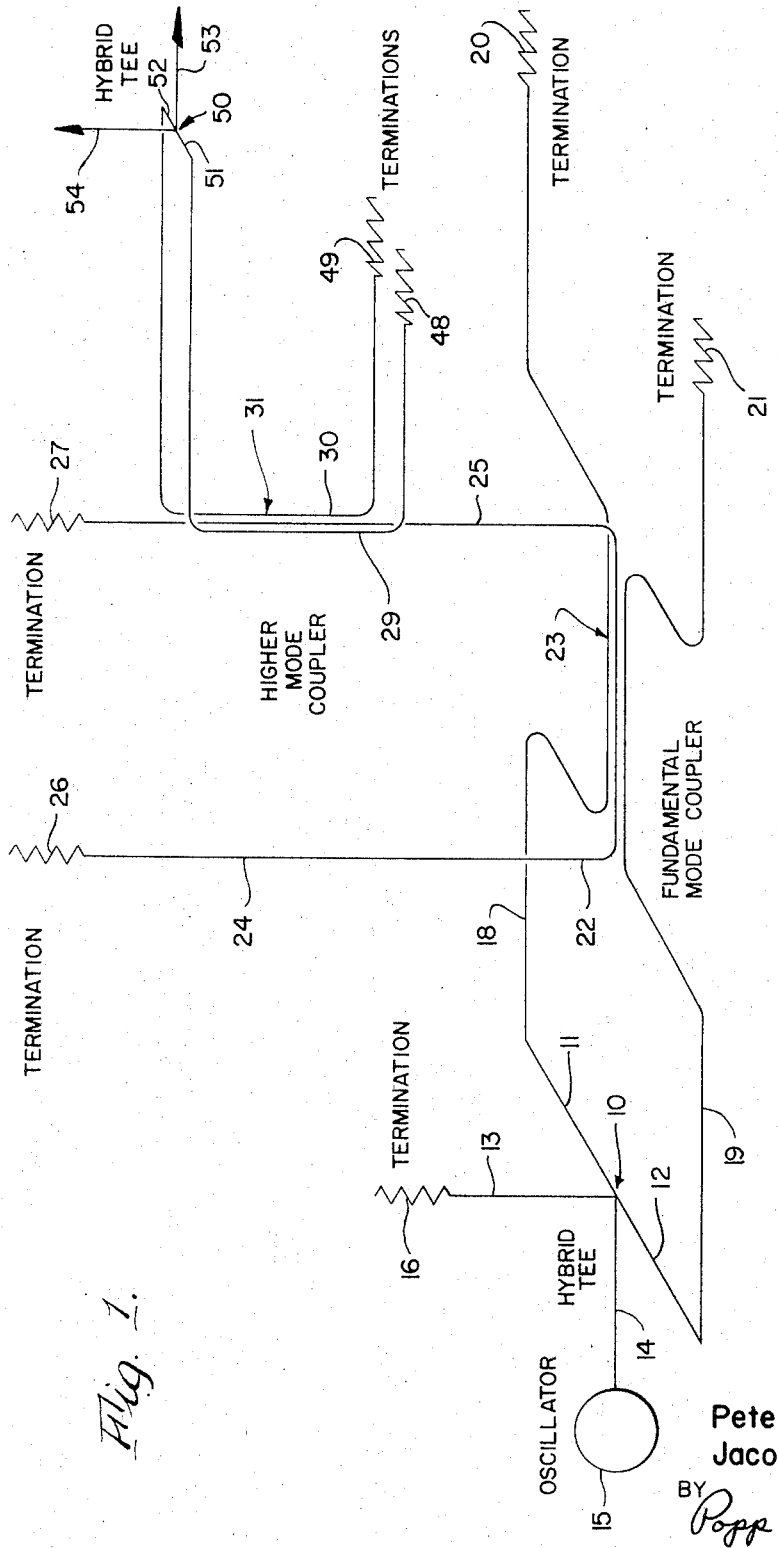
FIG. 1 is a perspective schematic view of waveguide apparatus including the higher mode coupler of the present invention and illustrating the same associated with means for measuring the intensity of the higher modes coupled out.

Referring to FIG. 1, the numeral 10 represents generally a device known to those skilled in the art as a hybrid tee or magic tee which includes three arms in one plane, i.e. opposite side arms or ports 11 and 12 and perpendicular E-arm or port 13, and also includes a fourth or H-arm or port 14 in a perpendicular plane. A suitable oscillator or magnetron 15 is shown as associated with arm 14. A suitable termination 16 is shown as associated with arm 13.

Severally connected to the ends of arms 11 and 12 are standard or regular size waveguides 18 and 19, respectively. These waveguides 18 and 19 are identical in size and at their remote ends are associated with suitable identical terminations 20 and 21, respectively.

Intermediate their ends the waveguides 18 and 19 are shown as gradually bent closer to each other and then gradually bent farther apart. Between these juxtaposed portions of the waveguides 18 and 19 is disposed a portion of another waveguide 22 which is oversize, i.e., so dimensioned that higher modes of an electromagnetic wave as well as the fundamental mode thereof can propagate in such oversize waveguide. The common walls of the waveguides 18, 22 and 19, 22 have coupling holes (not shown) which provide an assembly known to those skilled in the art as a fundamental mode coupler, represented generally by the numeral 23 in FIG. 1. Its purpose is to excite in the central oversize waveguide 22 substantially only the fundamental mode of the electromagnetic waves.

Central waveguide 22 is shown as having opposite end portions 24 and 25 turned away from the longitudinal extent of coupler 23. The ends of waveguide portions 24 and 25 are shown as associated severally with suitable terminations 26 and 27, respectively.

In accordance with the present invention waveguide portion 25 in association with other waveguides 29 and 30 comprise a higher mode coupler designated generally by the numeral 31 in FIG. 1.

Referring to FIG. 2, each of waveguides 25, 29 and 30 is rectangular in cross-section. Central waveguide 25 includes a pair of opposite broad sides 32 and 33 and a pair of opposite narrow sides 34 and 35. As viewed in FIG. 2, waveguide 29 is below and waveguide 30 is above waveguide 25. Lower waveguide 29 includes a pair of opposite broad sides 36 and 37 and a pair of opposite narrow sides 39 and 40. Upper waveguide 30 includes a pair of opposite broad sides 41 and 42 and a pair of opposite narrow sides 43 and 44.

In FIG. 2, broad sides 32 and 33 and narrow sides 39, 40, 43 and 44 are shown arranged horizontally, while broad sides 36, 37, 41 and 42 and narrow sides 34 and 35 are shown arranged vertically. Sides 32 and 40 for the width of side 40 provide a common wall. Similarly sides 33 and 43 for the width of side 43 provide a common wall.

Outer or lower and upper waveguides 29 and 30 are shown as being similarly dimensioned in cross-section but smaller proportionately than intermediate waveguide 25 and centrally and symmetrically arranged on opposite sides thereof.

Common wall 33, 43 is provided with at least one coupling slot 45. Common wall 32, 40 also is provided with at least one coupling slot 46. As shown these slots 45 and 46 are directly opposite each other. As also shown a second pair of opposite slots 45' and 46' is provided in these common walls and longitudinally spaced from the corresponding slots 45 and 46.

All of these slots 45, 45', 46 and 46' extend through the corresponding common wall to connect the interiors of the corresponding waveguides. Thus slots 45 and 45' connect the interiors of waveguides 25 and 30, whereas slots 46 and 46' connect the interiors of waveguides 25 and 29.

Figure 5:
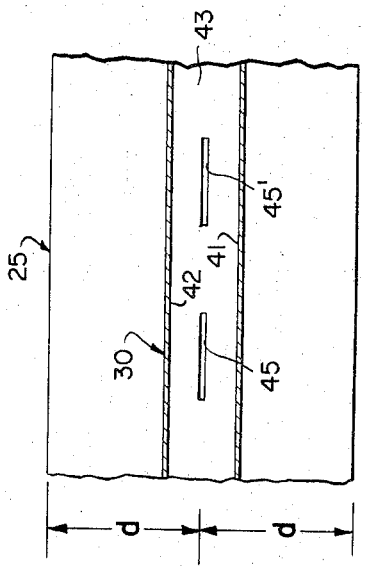
FIG. 5 is a longitudinal sectional view of the higher mode coupler taken on line 5—5 of FIG. 2.

The major dimension of each of slots 45, 45' 46 and 46' must extend longitudinally of intermediate waveguide 25 and be arranged centrally thereof as determined in a transverse direction. Thus, referring to FIG. 5, the perpendicular distance $d$ from each narrow side of waveguide 25 to the centerline of alined slots 45 and 45' is equal. The same is true for slots 46 and 46'.

While a slot should be elongated, no critical relationship exists between its length and width, although preferably a slot should be narrow so that its area is small and hence the amount of power that is coupled out or bled off through the slot is kept low. The elongated side edges of any of slots 45, 45', 46 and 46' are preferably parallel in plan although they need not be but in any event must be symmetrical about a central longitudinal axis.

One coupling slot in one common wall and another coupling slot in the opposite common wall, whether or not such slots are directly opposite each other or offset longitudinally of the central waveguide, will provide a higher mode coupler, permitting different higher modes to be separately coupled out through the slots. However, providing at least two slots in each common wall properly spaced a higher mode directional coupler is provided. In such an arrangement, as illustrated, each opposite pair of coupling slots such as 45 and 46 must be similarly shaped and sized. They are shown as being directly opposite each other although this is not essential.

Referring to FIG. 1, outer waveguides 29 and 30 at one corresponding end are connected to suitable terminations 48 and 49, respectively, and at their other corresponding end are operatively associated with a hybrid tee or magic tee represented generally by the numeral 50. Such hybrid tee 50, as better illustrated in FIG. 2, has four arms or ports 51, 52, 53 and 54. Three arms or ports 51, 52 and 53 are arranged in one plane with arms or ports 51 and 52 opposite each other and connected severally to waveguides 29 and 30, respectively. Arm or port 53 is designated an in-phase port for the $TE_{01}$ higher mode, as explained infra. The fourth arm or port 54 is designated an out-of-phase port for the $TE_{20}$ higher mode, as also explained infra.

In FIG. 2, the lines 29' and 30' represent diagrammatically extensions or continuations of outer waveguides 29 and 30, respectively, leading up to arms or ports 51 and 52, respectively. It is essential that the lengths of the outer waveguides 29 and 30 (or 29' and 30') extending from the higher mode coupler 31 to the hybrid tee 50 be equal if the coupling slots such as slots 45' and 46' are directly opposite each other. If these slots are not directly opposite each other then the lengths of lines 29' and 30' must be adjusted so that the effective distances from these slots to the ports 51 and 52 of hybrid tee 50 are the same.

The oscillator 15 in combination with the hybrid tee 10 provide means for propagating electromagnetic waves of equal amplitude and phase through the two outer waveguides 18 and 19 of the fundamental mode coupler 23. Through this coupler 23 substantially only the fundamental mode $TE_{10}$ is excited in central waveguide 22, 24, 25 although dimensionally it is large enough so that higher modes such as $TE_{20}$ and $TE_{01}$ can propagate therein, the latter two modes being illustrated in FIG. 2 and also in FIGS. 3 and 4, respectively.

Figure 4:
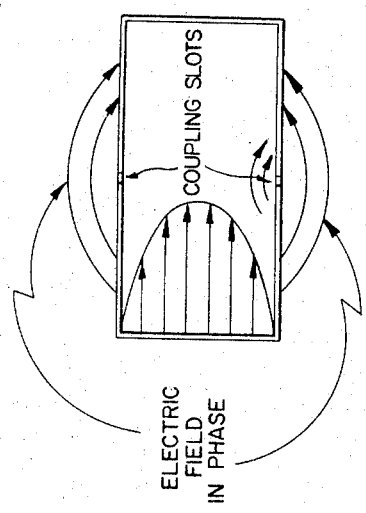
FIG. 4 is a cross-sectional view of the central oversize waveguide of the higher mode coupler and illustrates the $TE_{01}$ mode coupling pattern.
Figure 6:
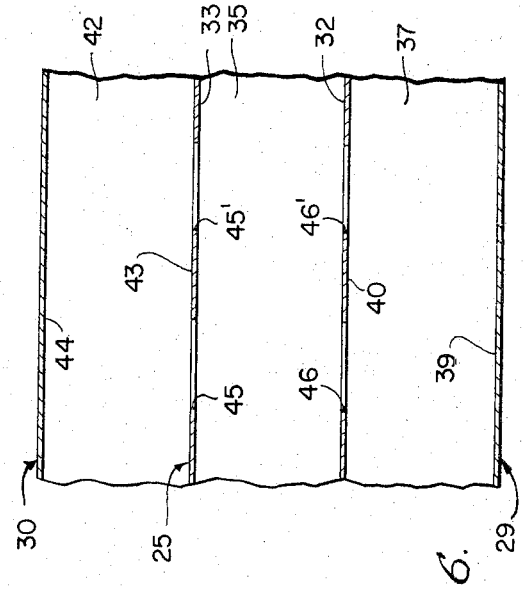
FIG. 6 is a longitudinal sectional view of the higher mode coupler taken on line 6—6 of FIG. 2.
Figure 3:
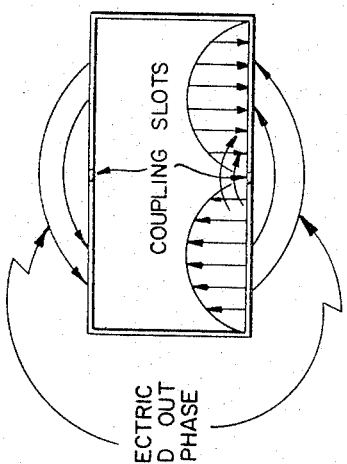
FIG. 3 is a cross-sectional view of the central oversize waveguide of the higher mode coupler and illustrates the $TE_{20}$ mode coupling pattern.

The purpose of higher mode coupler 31 is to couple out from oversize waveguide 25 through coupling slots 45, 45', 46 and 46' the higher modes $TE_{20}$ and $TE_{01}$. The $TE_{20}$ mode coupling pattern is illustrated in FIG. 3, and the $TE_{01}$ mode coupling pattern is illustrated in FIG. 4. Because of its symmetry and the polarization of the electric field, the fundamental mode $TE_{10}$ is not coupled through slots 45, 45', 46 and 46' from the oversize waveguide 25 to the standard or regular-size waveguides 29 and 30.

Referring to FIG. 3, the higher mode $TE_{20}$ is coupled out through slots such as 45 and 45' in one broad side of oversize waveguide 25 and is out of phase with the same mode coupled out through slots such as 46 and 46' in the opposite broad side.

Referring to FIG. 4, the higher mode $TE_{01}$ that is coupled out through the slots such as 45 and 45' in one broad side of oversize waveguide 25, is in phase with the same mode coupled out through slots such as 46 and 46' in the opposite broad side.

By reason of the connection of regular-size waveguides 29 and 30 with hybrid tee 50, the higher mode $TE_{20}$ will appear at the out-of-phase port 54 of the hybrid tee and the other higher mode $TE_{01}$ will appear at the in-phase port 53 of the hybrid tee.

In this manner, the higher modes $TE_{20}$ and $TE_{01}$ may be separated and measured.

If the width dimension of the internal surface of broad side 32 or 33 of the oversize waveguide 25 is precisely double the corresponding dimension of either narrow side 34 or 35, then the guide wavelengths of both higher modes in the waveguide 25 are equal. The dimensions and the longitudinal separation of the coupling slots such as 45 and 45' or 46 and 46' may be computed using known mathematical techniques employed in conventional directional-coupler design. The significance of the fact that the guide wavelengths are equal is that the coupling coefficient through the slots for both higher modes will be the same and the directivity coefficient will be the same.

Variations may occur to those skilled in the art and hence the embodiment shown is illustrative and not limitative of the present invention which is to be measured by the scope of the appended claims.

What is claimed is:

1. In electromagnetic wave apparatus, a higher mode directional coupler comprising a first waveguide rectangular in cross-section including a pair of opposite broad side walls and so dimensioned that the fundamental mode and higher modes of an electromagnetic wave can propagate therein, each of said broad walls having a pair of elongated coupling slots longitudinally spaced from each other and arranged centrally therein and extending longitudinally thereof, and second and third waveguides severally on said broad walls and each being rectangular in cross-section having a narrow side providing a common wall with the corresponding one of said broad walls and communicating with the corresponding pair of said slots and so dimensioned that only the fundamental mode can propagate therein, whereby one of said higher modes coupled out through one pair of said slots is out of phase with the same mode coupled out through the other pair of said slots and another of said higher modes coupled out through one pair of said slots is in phase with the same mode coupled out through the other pair of said slots.

2. In electromagnetic wave apparatus, a higher mode directional coupler comprising a first waveguide rectangular in cross-section including a pair of opposite broad side walls and so dimensioned that the fundamental mode and higher modes of an electromagnetic wave can propagate therein, each of said broad walls having a pair of elongated coupling slots longitudinally spaced from each other and arranged centrally therein and extending longitudinally thereof, and second and third waveguides severally on said broad walls and each being rectangular in cross-section having a narrow side providing a common wall with the corresponding one of said broad walls and communicating with the corresponding pair of said slots and so dimensioned that only the fundamental mode can propagate therein, said second and third waveguides being similarly dimensioned in cross-section and symmetrically arranged on opposite sides of said first waveguide, whereby one of said higher modes coupled out through one pair of said slots is out of phase with the same mode coupled out through the other pair of said slots and another of said higher modes coupled out through one pair of said slots is in phase with the same mode coupled out through the other pair of said slots.

3. In apparatus including a first waveguide rectangular in cross-section having a pair of opposite broad side walls and so dimensioned that the fundamental mode and higher modes of an electromagnetic wave can propagate therein, the combination therewith of means for segregating modes which can be adapted for measuring the intensity of said higher modes, comprising a hybrid tee having two input ports, an out-of-phase port and an in-phase port, and second and third waveguides severally on said broad walls and connected to said input ports and each being rectangular in cross-section having a narrow side providing a common wall with the corresponding one of said broad walls and so dimensioned that only the fundamental mode can propagate therein, such common walls having coupling slots connecting the interiors of the corresponding waveguides, whereby one of said higher modes coupled out through one of said slots in one of said common walls is out of phase with the same mode coupled out through one of said slots in the other of said common walls and appears at said out-of-phase port and another of said higher modes coupled out through one of said slots in one of said common walls is in phase with the same mode coupled out through one of said slots in the other of said common walls and appears at said in-phase port.

4. In apparatus including a first waveguide rectangular in cross-section having a pair of opposite broad side walls and so dimensioned that the fundamental mode and higher modes of an electromagnetic wave can propagate therein, the combination therewith of means for segregating modes which can be adapted for measuring the intensity of said higher modes, comprising a hybrid tee having two input ports, an out-of-phase port and an in-phase port, each of said broad walls having a pair of coupling slots longitudinally spaced from each other and arranged centrally therein and extending longitudinally thereof, and second and third waveguides severally on said broad walls and connected to said input ports and each being rectangular in cross-section having a narrow side providing a common wall with the corresponding one of said broad walls and communicating with the corresponding pair of said slots and so dimensioned that only the fundamental mode can propagate therein, whereby one of said higher modes coupled out through one pair of said slots is out of phase with the same mode coupled out through the other pair of said slots and appears at said out-of-phase port and another of said higher modes coupled out through one pair of said slots is in phase with the same mode coupled out through the other pair of said slots and appears at said in-phase port.

5. In apparatus including a first waveguide rectangular in cross-section having a pair of opposite broad side walls and so dimensioned that the fundamental mode and higher modes of an electromagnetic wave can propagate therein, the combination therewith of means for segregating modes which can be adapted for measuring the intensity of said higher modes, comprising a hybrid tee having two input ports, an out-of-phase port and an in-phase port, each of said broad walls having a pair of coupling slots longitudinally spaced from each other and arranged centrally therein and extending longitudinally thereof, and second and third waveguides severally on said broad walls and connected to said input ports and each being rectangular in cross-section having a narrow side providing a common wall with the corresponding one of said broad walls and communicating with the corresponding pair of said slots and so dimensioned that only the fundamental mode can propagate therein, said second and third waveguides being similarly dimensioned in cross-section and symmetrically arranged on opposite sides of said first waveguide, the distance from said slots in one of said broad walls to the corresponding one of said input ports being the same as the distance from said slots in the other of said broad walls to the corresponding one of said input ports, whereby one of said higher modes coupled out through one pair of said slots is out of phase with the same mode coupled out through the other pair of said slots and appears at said out-of-phase port and another of said higher modes coupled out through one pair of said slots is in phase with the same mode coupled out through the other pair of said slots and appears at said in-phase port.

References Cited

UNITED STATES PATENTS

| | | | |
|---|---|---|---|
| 2,684,469 | 7/1954 | Sensiper | 333—21 X |
| 3,112,460 | 11/1963 | Miller | 333—10 X |

HERMAN KARL SAALBACH, *Primary Examiner.*

R. COHN, M. NUSSBAUM, *Assistant Examiners.*